Nov. 7, 1939. J. A. BRIGGS 2,179,398
METHOD OF ASSEMBLING AND WELDING LOUDSPEAKER PARTS
Filed Dec. 15, 1937 2 Sheets-Sheet 1

Inventor
Joseph A. Briggs
by his Attorneys
Howson & Howson

Nov. 7, 1939.   J. A. BRIGGS   2,179,398
METHOD OF ASSEMBLING AND WELDING LOUDSPEAKER PARTS
Filed Dec. 15, 1937   2 Sheets-Sheet 2
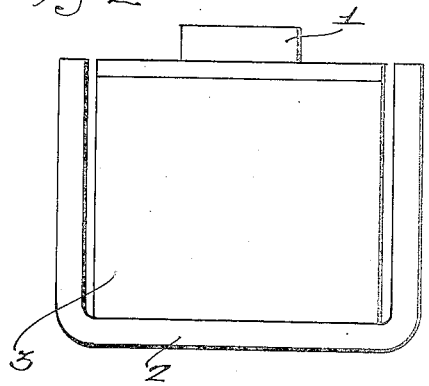
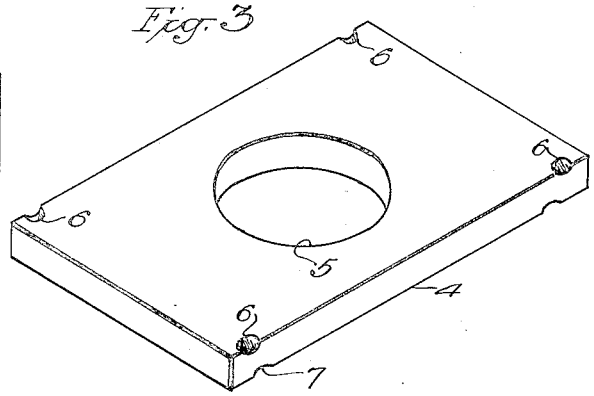
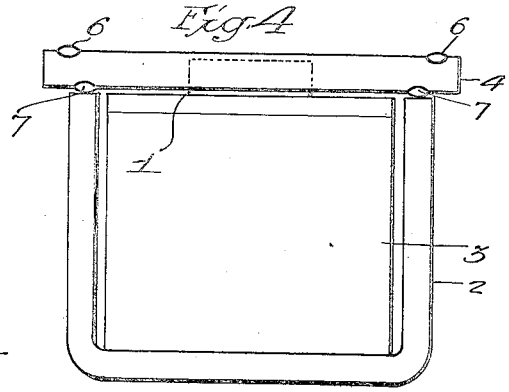
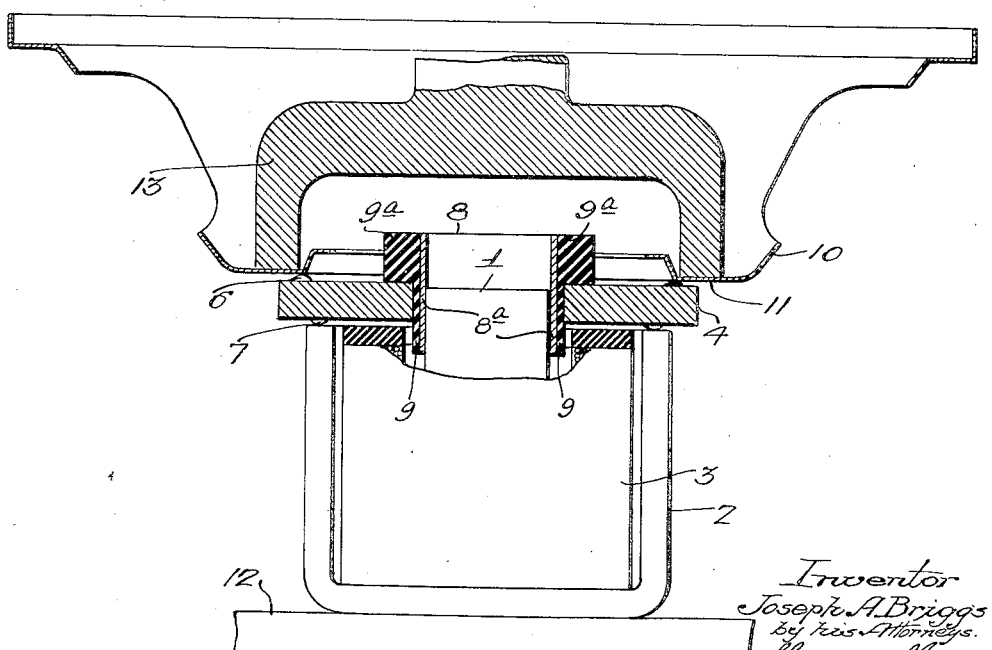

Patented Nov. 7, 1939

2,179,398

UNITED STATES PATENT OFFICE 2,179,398

METHOD OF ASSEMBLING AND WELDING LOUDSPEAKER PARTS

Joseph A. Briggs, Erlton, N. J., assignor to Philco Radio & Television Corporation, Philadelphia, Pa., a corporation of Delaware Application December 15, 1937, Serial No. 180,019

2 Claims. (Cl. 219—10)

This invention relates to new and useful methods of assembling loud speaking devices of the electro-dynamic type, and more particularly to the method of assembling the core and pole pieces of the magnetic system and the speaker cone supporting structure or frame.

In radio loud speakers of the electro-dynamic type, the magnetic system usually comprises a pole piece and a core, the latter consisting of a substantially U-shaped member to which the pole piece is centrally secured and a top plate which is secured across the upper ends of said U-shaped member and provided with a central opening therein through which the pole piece is adapted to extend or project, the diameter of said opening in the top plate being greater than the diameter of the pole piece so that an annular air gap is provided therebetween within which the voice coil, for actuating the speaker cone or diaphragm, may be mounted for free and unrestricted movement. Also in such devices the speaker cone frame is usually secured upon the upper face of the top plate of the core substantially concentrically of the opening therein and said cone frame and the two core members are usually welded together to provide a unitary structure.

Up to the present time, however, these several parts have usually been secured together by two separate or independent welding operations, that is, the top plate member of the core is first welded to the upper ends of the U-shaped member thereof while the opening in the former is maintained truly centered with respect to the pole piece by means of a gauge, mandrel or the like which is inserted within the air gap about said pole piece, after which the speaker cone frame is independently welded to the upper surface of said top plate member of the core in the desired relation with respect thereto. When the top plate portion of the core is welded in this manner to the U-shaped portion thereof, the upper electrode of the welding apparatus directly contacts or engages the upper surface of the said top plate. Consequently, any misalignment of the two welding electrodes manifests itself by causing the top plate to correspondingly shift laterally with respect to the U-shaped member and pole piece and bind the centering gauge or mandrel therebetween with the result that said gauge or mandrel must be forcibly removed from the air gap which is now not truly centered with respect to the pole piece.

With the foregoing observations in mind, the principal object of the present invention is to provide a novel method for assembling radio loud speaking devices of the electro-dynamic type, wherein shifting or displacement of the top plate of the core is entirely eliminated and accurate centering of the pole piece within the opening therein is positively and at all times insured.

Another object of the invention is to provide a novel method of the character described which may be accomplished or completed by a single welding operation, thus materially reducing the cost and labor incident to assembly of these parts of loudspeaking devices.

These and other objects of the invention and the features and details of the various steps of the method contemplated by said invention are hereinafter fully set forth and illustrated in the accompanying drawings, in which:

Figure 2 is a view in elevation of the central pole piece, coil and U-shaped portion of the core of the magnetic system of the loud speaker;

Figure 3 is a view in perspective of the top plate portion of the core of said magnetic system;

Figure 4 is a view in elevation showing the top plate portion of the core associated with the U-shaped portion and pole piece of the magnetic system preparatory to welding; and Figure 5 is a view similar to the disclosure in Figure 1, showing the relative positions of the parts of the magnet, the centering gauge, the speaker cone frame and the electrodes, at the beginning of the welding operation.

Figure 1:
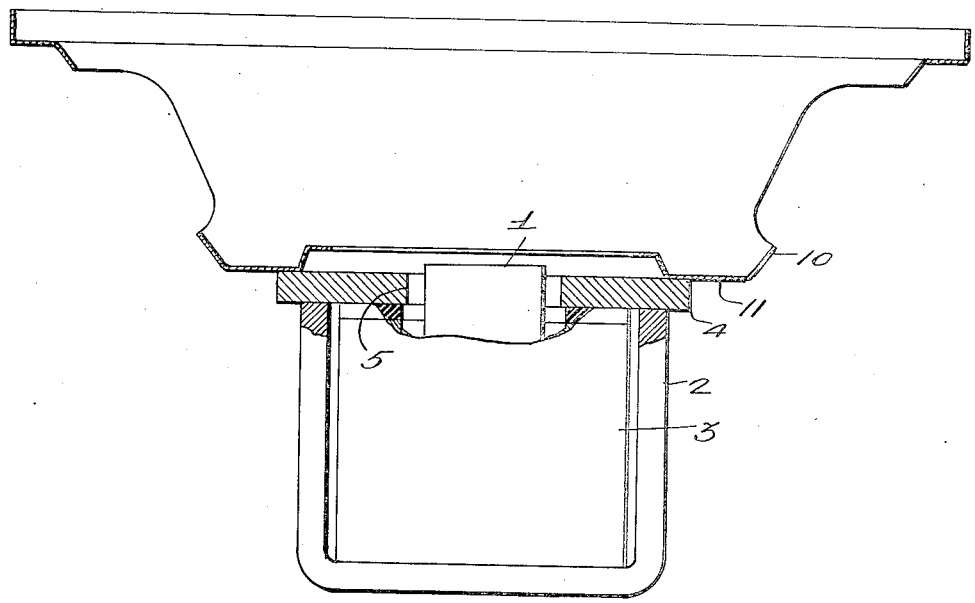
Figure 1 is a longitudinal view partially in section axially through the several parts of a loudspeaking device assembled according to the present invention.

The invention consists essentially in the discovery that by welding the portions of the core of the magnetic system and the speaker cone frame together simultaneously by a single welding operation, any misalignment occurring between the upper and lower welding electrodes is taken up by the cone frame due to the fact that the molten metal produced at the start of the welding operation between said cone frame and top plate allows the former to shift relative to the latter which is held in accurately centered relation with respect to the central pole piece by means of the centering gauge or mandrel.

Referring now particularly to the drawings, the magnetic system of the speaker comprises a pole piece 1 which is permanently secured at its lower end centrally of the bottom portion of a U-shaped core member 2 and surrounded by the usual magnet coil or winding 3. The top plate member 4 of the core is provided with a central opening 5 therein of a diameter greater than the diameter of the central pole piece 1 and small projecting nipples or teats 6 and 7 are respectively formed inwardly adjacent the ends of each side edge of the top plate at opposite faces thereof by punching or otherwise displacing a small portion of the metal of said top plate in the manner shown, the nipples or teats 7 at the under side of the top plate being spaced relative to each other longitudinally of said top plate so as to engage the upper end faces of the U-shaped core member 2 when the top plate 4 is positioned thereon with the central pole piece 1 projecting through its opening 5, as shown in Figure 4 of the drawings.

The top plate 4 is now positioned upon the U shaped core member 2 and the pole piece 1 is accurately and truly centered within the opening 5 therein by means of a gauge, mandrel or the like 8 which is placed about said pole piece 1 and suspended within the space or gap provided between it and the surrounding portions of the top plate core member 4 as shown in Figure 5. The mandrel 8 comprises an inner sleeve 8a and an outer sleeve 9 of insulating material having supporting collar portion 9a, the outer surface of the sleeve portion 9 of the gauge or mandrel 8 residing within the air gap being machined to fit snugly and accurately within the opening 5 in the top plate 4 and the bore thereof being machined to snugly and accurately receive the central pole piece 1. The speaker cone frame 10 is next positioned upon the top plate 4 so that its annular portion 11 rests upon the small nipples or teats 6 at the upper side thereof and in this relation the several parts of the loud speaking device are disposed intermediate a stationary electrode 12 in axial alignment with an upper movable electrode 13 of generally annular form arranged to engage said annular portion 11 of the speaker cone frame in the relation shown in Figure 5 of the drawings.

An electric current is supplied to the electrodes 12 and 13 and as the latter, the movable electrode, is brought into contact with the speaker cone frame, the circuit from one electrode to the other will be completed and concentrated through the small projecting nipples or teats 6 and 7, respectively, thereby melting them as the upper electrode continues to move downwardly in the direction of the stationary electrode 12 to effect a compression of the speaker cone frame 10 upon the top plate 4 and the latter upon the upper end faces of the U-shaped member 2 with the result that said parts are permanently welded together in the relation shown in Figure 1 of the drawings. Initial melting of the teats allows the cone frame 10 to shift with respect to the top plate 4 while the latter is maintained centered with respect to the pole piece 1 by means of the mandrel or gauge 8, and when the several parts of the speaker structure have been welded together, as above described, said mandrel or gauge 8 may be readily withdrawn from the air gap between said pole piece 1 and top plate member 4 of the magnetic system, and this may be accomplished in most instances by merely inverting the thus partially assembled speaker, whereupon said gauge or mandrel will emerge from the air gap by virtue of its own weight and force of gravity.

By welding the speaker cone frame and the two members of the core of the magnet together by means of a single welding operation, as above described, accurate centering of the pole piece within the opening 5 in the top plate 4 is positive and assured, and any misalignment of the welding electrodes will be taken up or compensated for by lateral displacement of the cone frame relative to said top plate which by virtue of the mandrel or gauge 8 is maintained or held in truly centered relation with respect to the pole piece. Furthermore, the method of welding contemplated by this invention affords a substantial saving of both time and money over prior practices in the art. It will be obvious, of course, that the teats or nipples 6 and 7 may be formed, respectively, at the underside of the cone frame 10 and upper end faces of the arms of the U-shaped core member 2 without departing from the invention; and while the various steps and procedure of the present method have been described in detail, it is not intended that said invention be limited to such disclosure, but that these changes as well as various other changes and modifications in the procedure and the various elements and instrumentalities employed, may be embodied and incorporated within the scope of the annexed claims.

I claim:

1. In the fabrication of loudspeakers having a field structure comprising a field yoke and a central pole piece, an apertured top plate and a cone frame; the steps in the method of assembling said parts which consist in forming projecting teats on certain of said parts at predetermined locations thereon so that when the top plate is positioned on the field yoke and the cone frame on said top plate each of said parts will contact an adjacent part solely at said projecting teats, positioning said apertured top plate on the field yoke so that the central pole piece resides in the aperture thereof, fixedly centering said top plate aperture with respect to said central pole piece, positioning said cone frame loosely on the top plate and then passing an electric current from the cone frame to said top plate and from the latter to said field yoke to simultaneously weld said parts together, said teats permitting slippage of said parts during welding to be taken up by movement of said cone frame with respect to the top plate while the latter is maintained accurately centered with respect to the central pole piece.

2. In a method of assembling and welding together the apertured top plate and pole piece carrying field yoke of the magnet and the cone frame of sound reproducing devices; the steps which consist in forming projecting teats on the upper and lower faces of said top plate member, positioning the top plate upon said pole piece carrying field yoke so that the latter is engaged solely by the teats at the underside of said top plate and the aperture therein is disposed concentrically about the pole piece carried by the field yoke, fixedly centering the top plate aperture with respect to said pole piece, positioning said cone frame loosely upon said top plate member so that it rests upon the projecting teats at the upper side of the top plate, and then passing an electric current from the cone frame to the top plate and from the latter to said field yoke to simultaneously weld together the members thus assembled, said teats permitting the cone frame to shift relative to said top plate while the latter is maintained fixedly centered with respect to the pole piece.

JOSEPH A. BRIGGS.